INFORMATION HANDLING APPARATUS

Filed Oct. 29, 1962 2 Sheets-Sheet 1

INVENTOR.
RICHARD M. BLOCH
BY Henry L. Hanson
ATTORNEY

April 26, 1966 R. M. BLOCH 3,248,696

INFORMATION HANDLING APPARATUS

Filed Oct. 29, 1962 2 Sheets-Sheet 2

INVENTOR.
RICHARD M. BLOCH
BY Henry L. Hanson
ATTORNEY

United States Patent Office 3,248,696
Patented Apr. 26, 1966

3,248,696

INFORMATION HANDLING APPARATUS

Richard M. Bloch, Framingham, Mass., assignor to Honeywell Inc., a corporation of Delaware Filed Oct. 29, 1962, Ser. No. 233,809
6 Claims. (Cl. 340—146.1)

A general object of the present invention is to provide a new and improved apparatus useful for generating data for automatic checking and correction purposes. More specifically, the present invention is concerned with a new an improved apparatus for generating checking and correction data in conjunction with data selected by way of a manually operated keyboard which functions as a data selector and wherein certain data that may be selected by way of the keyboard is also utilized in producing checking and correction data which is selectively printed in a manner corresponding to the printing of the data selected by way of the keyboard.

Data which is created for business purposes, particularly of the statistical type, must frequently be machine-processed. The machine processing may well involve document-reading equipment which is capable of recognizing characters that have been printed on a document whether the characters are represented by way of a specialized type of "bar" code or in a predetermined Arabic alpha-numeric form. Many documents which are ultimately destined for machine processing of one type or another are frequently manually prepared. This manual preparation may well be by way of a manual-electrical typewriter wherein the individual alpha-numeric characters to be printed are sequentially selected on a keyboard by an operator. Other types of field document imprinters may be used. In preparing a document in the field, there is a need to ensure that the document carries with it appropriate checking data which may be ultimately used during machine processing to determine if the data is read without error. The checking data which accompanies the data selected by the operator must be appropriately related to all of the data transferred to ensure that substantially all possible errors, due to misreading or obliterated data, that might occur, may be detected and, under many circumstances, be corrected.

The generation of checking data for coded information is widely used in many types of data processing systems. The generation of the checking data may be readily accomplished in a data processing system by utilizing the full powers of the computing facilities available. While this method of generatng checking data is satisfactory when a complete computing system is available, there are instances where a remote field imprinter or printing device, such as a typewriter, is used for creating documents destined for ultimate use in a data processing system. Consequently, there is a need to have associated with a remote field imprinter suitable apparatus capable of producing checking data which may be required for subsequent data processing.

It is accordingly a further object of the present invention to provide a new and improved apparatus which is adapted for convenient association with a field imprinter or typing device which is capable of producing checking data and effecting a printing operation by way of data in the form that is being printed by the field device.

To be effective in the manner contemplated herein, a field imprinting device must have associated therewith a powerful checking data-generating means. It is essential that any such data-generating means respond to each operation of the field device effected by an operator and that the response be effected in a simple and yet complete manner so that it will be possible to utilize the resultant checking data with a high degree of certainty that the checking operation performed will indicate any errors due to misreading or loss of information that have occurred in the automatic processing of the resultant document. Thus, it is essential that any checking data that is produced by a field imprinter accurately include information related to each of the characters and other control actions selected by the operator. Further, it is desirable that the checking data-producing apparatus be arranged so that should an error occur in adjacent characters in the process of reading a field-created document, the checking data may be used to determine not only the particular characters that may be misread or missing but also provide data that may be useful for correcting two adjacent characters that may not have been read properly.

It is accordingly a more specific object of the present invention to provide a new and improved apparatus that may be directly used with a field imprinting apparatus to produce checking data that may be appropriately recorded on the field-prepared document at the time that it is being prepared.

Another more specific object of the present invention is to provide a new and improved apparatus useful with a manually operated typing mechanism or a field imprinter, which is used for preparing documents for subsequent automatic processing, which apparatus is capable of producing a multi-character check data which may be automatically appended to data imprinted in the field by the apparatus as an operator is preparing the basic document in the field.

Still another object of the present invention is to provide a new and improved apparatus in accordance with the foregoing objects wherein said apparatus is simple and economical to associate with a relatively inexpensive field-imprinting device and wherein the resultant checking data that is produced has a relatively high power in terms of it carrying adequate information that may be used for subsequent checking and correction of single and multiple type errors.

The foregoing objects and features of novelty which characterize the invention, as well as other objects of the invention, are pointed out with particularly in the claims annexed to and forming a part of the present specification. For a better understanding of the invention, its advantages and specific objects attained with its use, reference should be had to the accompanying drawings and descriptive matter in which there is illustrated and described a preferred embodiment of the invention.

Figure 1:
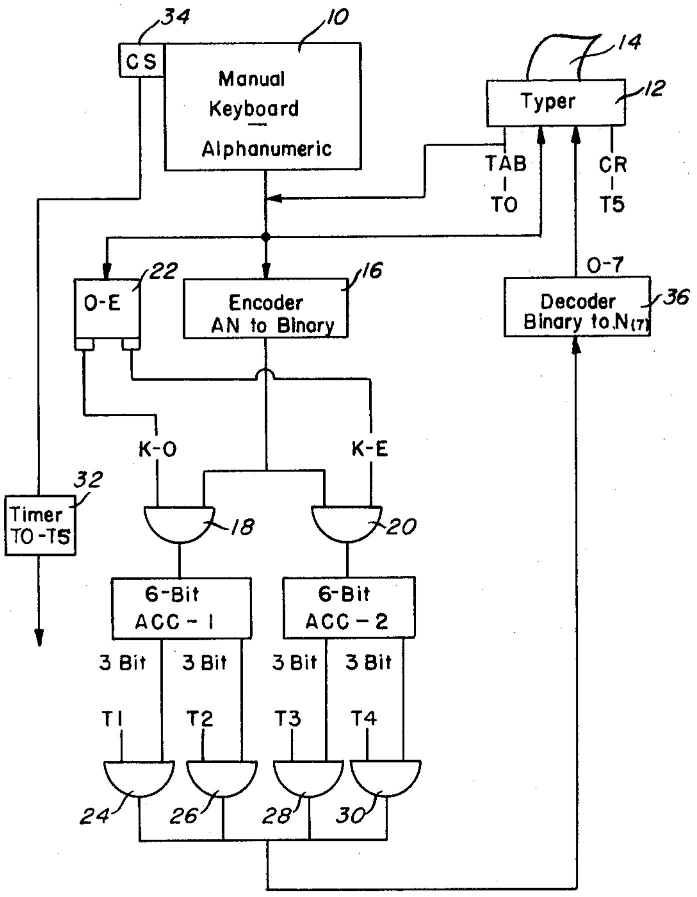
FIGURE 1 is a diagrammatic showing of a preferred embodiment of the invention.
Figure 2:
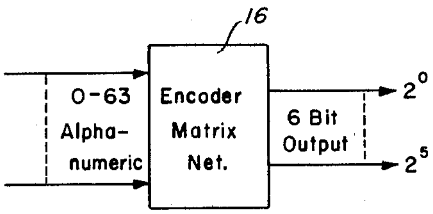
FIGURE 2 is a diagrammatic showing of an encoder which may be used in the present apparatus.

Referring first to FIGURE 1, the apparatus illustrated therein is intended to function as a field imprinter or field document-preparing device. By way of this device, an operator, such as a trained typist, may prepare a document which may be subsequently used for, or in conjunction with, an automatic document-processing apparatus. The document being prepared, in the embodiment described herein, is assumed to be one wherein there will be a series of characters and numbers typed in a predetermined sequence. Following the typing of the desired statistical data, the operator is provided with a further facility which will activate the typing mechanism or printing mechanism to produce, on the document being prepared, checking data which has been in the process of generation as the operator was typing or printing the statistical data on the document. After the checking data has been appropriately placed upon the document, the apparatus is then sequenced back to a starting position in preparation for a further typing or printing operation by the operator.

Considering FIGURE 1 in greater detail, the numeral 10 identifies a manual keyboard which may be associated with an appropriate typer or printing mechanism 12. The keys on the manual keyboard 10 are assumed to be arranged in a manner corresponding to the conventional typewriter keyboard having the normal alpha-numeric characters available as well as the usual punctuation and control keys. The printing mechanism 12 is adapted to print on a suitable document 14 data selected by an operator on the keyboard 10.

As the operator is selecting the information which he desires to print on the document 14, the check number generating circuitry of the present invention is sensing the operations being performed by the operator and is accumulating data which may subsequently be used for creating signals for activating the printing mechanism 12 in accordance with the checking data which has been generated. The apparatus for effecting this check number generation includes an encoder 16 which has an input connected directly to the output of the manual keyboard 10. The encoder 16 is here assumed to be an alpha-numeric-to-binary encoder. The binary code on the output of the encoder 16 is adapted to be applied to the input of a pair of AND gating means 18 and 20. These gating means are arranged to be alternately activated as each character selection is mde by the operator at the keyboard 10. The switching of these gates in this manner is effected by way of a bistable switching circuit 22 which is herein referred to as the odd-even switch. The input to this switching circuit 22 is derived directly from the output of the manual keyboard 10.

The outputs of the AND gating circuits 18 and 20 are arranged for application to a pair of accumulators ACC–1 and ACC–2. These accumulators are each assumed to comprise six-bit inputs which are adapted to control, by way of a parallel input, six binary flip-flops. These binary flip-flops are assumed herein to be operating modulo 2 without carry between their respective stages.

The outputs of the accumulators are arranged to be selectively gated in time sequence by way of a series of AND gate means 24, 26, 28 and 30. Each of the AND gate means illustrated in FIGURE 1 is assumed to be capable of transferring three bits in parallel at an appropriate time interval determined by a timing input signal T. The timing signals for the gating circuits 24, 26, 28 and 30 are assumed to be derived from an appropriate timing mechanism 32, the latter of which may be brought into operation by way of a control switch 34 positioned adjacent the manual keyboard.

The outputs of the AND gating circuits 24, 26, 28 and 30 are arranged to supply the parallel output bits from the accumulator sections to which they are connected to the input of a decoder 36. This decoder 36 serves to convert the binary code on the input thereof to a signal on one of eight possible output lines to define a numeric code, modulo 7, which in turn may act upon the selection means within the printing mechanism 12.

Before considering the detailed operation of the apparatus illustrated in FIGURE 1, reference should be made to the apparatus illustrated in FIGURES 2 through 5. Considering first the apparatus shown in FIGURE 2, the encoder associated with the present apparatus is assumed to be a matrix type encoder which is adapted to accept an input signal on one of 64 possible input lines and produce on the output thereof a six-bit binary code representative of the particular input line that has been activated. The 64 input lines available are arranged for individual activation by the keys at the keyboard 10 shown in FIGURE 1. The six-bit output code is assumed to be a six-bit code representative of the conventional translation between alpha-numeric information and binary data. The actual implementation of the encoder matrix network may be in accordance with standard recognized conversion techniques using diodes or electro-mechanical relays in a manner well known in the art. A reference showing the principles of this type of conversion circuitry will be found in a text entitled, "Pulse and Digital Circuits," by Millman et al., McGraw-Hill Book Company, Inc., 1956, noting in particular chapter 13.

Figure 3:
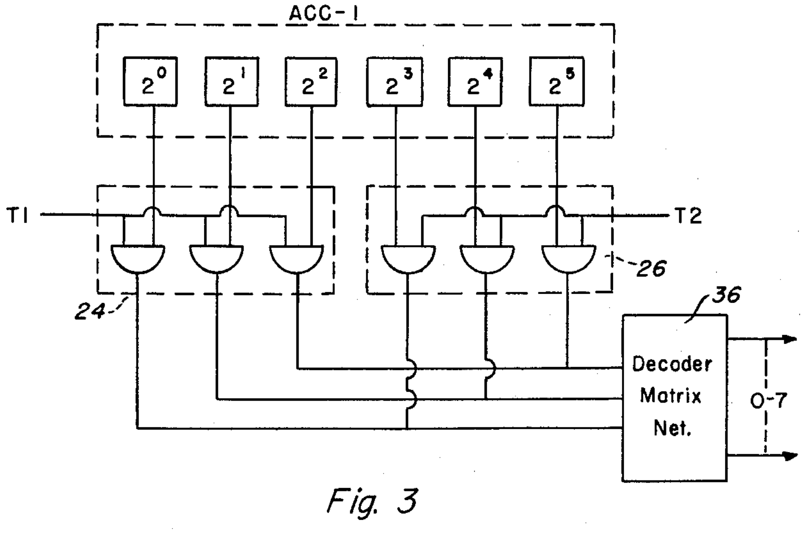
FIGURE 3 is a diagrammatic showing of some of the logical circuitry which may be associated with accumulators used in the present apparatus.

The accumulator ACC–1, shown in FIGURE 3, will be seen to comprise six individual circuits each of which may take the form of a binary flip-flop which is arranged to reverse its bistable state each time a particular type of binary input signal is received on the input thereof. The binary ranking or weighting of the individual stages of the accumulator may be considered in accordance with the binary-weighted values of the input code received from the encoder circuitry 16.

The outputs from the accumulator stages are shown connected to the AND gating means 24 and 26. These AND gating means actually take the form of three separate AND gates each of which has an input from an associated accumulator stage. These individual gating circuits within the gating means 24 are each adapted to be activated at time T1 so that a predetermined set condition within the associated accumulator stages will be able to pass through the associated gating circuits to the decoder matrix 36. It will be noted that the individual gating circuits of the gating means 26 will serve to couple the outputs of accumulator stages associated therewith to the input of the decoder matrix 36 at time T2.

The decoder matrix network 36 shown in FIGURE 3 is in the embodiment illustrated, one which accepts a three-bit input and produces an output signal on one of eight possible output lines. The construction of this matrix may well be by way of diodes and/or relays in a manner similar to the construction of the encoder matrix 16. The aforementioned reference shows typical circuitry used by those skilled in the art for implementing circuitry of the type required.

Figure 4:
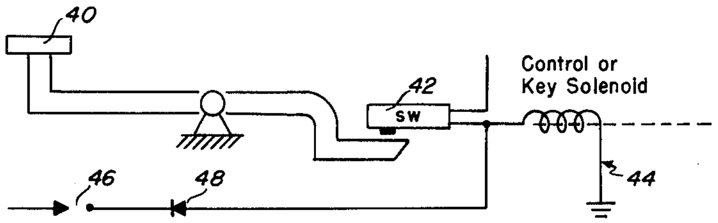
FIGURE 4 illustrates electrical circuitry associated with the printing or typing portion of the apparatus.

The manner in which the typer or printing mechanism 12 is activated by way of the keyboard may be understood by considering the individual selection key arrangement illustrated in FIGURE 4. Here, a selection key 40 is illustrated and this selection key is adapted to be one which, when actuated by an operator, will close an electrical switch 42. The closing of the switch 42 is adapted to complete an electrical circuit to a key selection solenoid 44. The key selection solenoid is in turn adapted to select the appropriate key and cause a printing operation to be performed in the typer 12. In a keyboard, each of the individual data selection and control keys may be arranged in the manner illustrated in FIGURE 4. For purposes of effecting external control of the key solenoid 44, a further input 46 may be provided and this further input is arranged for coupling by way of a suitable isolation diode 48 to the key solenoid 44. Thus, any individual key selection solenoid, such as the solenoid 44, may be selected by some external source other than by way of the direct closing of a switch by a manually operated key. The output of the decoder matrix 36, as pointed out above, will be by way of one of eight possible input lines, each input line of which may be connected to an input similar to the input 46 shown in FIGURE 4.

Figure 5:
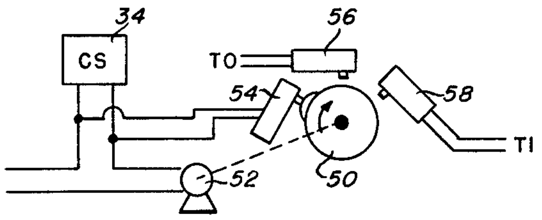
FIGURE 5 illustrates a representative timing or sequencing device which may be used with the apparatus.

While it will be obvious to those skilled in the art that many types of printing mechanisms may be used for purposes of generating the timing signals required in the present apparatus, a simple cam-driven timer such as illustrated in FIGURE 5 may be used. The cam-driven timer illustrated comprises a cam 50 driven by a suitable motor 52, the latter of which is adapted to be brought into operation by way of the control switch 34. Positioned adjacent the riser portion of the cam 50 are a series of switches 54, 56 and 58. Obviously, the number of switches required may be appropriately related to the number of timing functions to be performed. The timing switch 54 is assumed to be a circuit-holding switch which serves to maintain power on the motor 52 driving the cam 50 once the control switch 34 has been activated and released by the operator. As the cam 50 operates, the switch 56 will be first closed to produce the timing signal T0. Next the switch 58 will operate to produce the timing signal T1. Similar switches, not shown, may be used to produce the timing signals T2 through T5 to complete the cycling of the checking and printing apparatus associated with the final preparation of the document being prepared.

Considering next the operation of the over-all apparatus illustrated in FIGURE 1, it should first be considered that the apparatus has been cleared so that the typer 12 has had the carriage thereof returned to its normal starting position and the accumulators ACC–1 and ACC–2 have each been cleared of any information. As the operator selects each key in the sequence to produce the desired printing operation on the document 14 by way of the typer 12, the individual key selection made will be encoded by the encoder 16. The first key selection will be encoded and applied by way of the gating circuitry 18 into the accumulator ACC–1 since the odd-even switch 22 will initially be in the odd state to activate the gating means 18. When the second key is selected, this further data will be encoded and transferred through the gating means 20 into the accumulator ACC–2. A third key selection effects a further encoding, the result of which is then fed back through the gating means 18 to the accumulator ACC–1 where the bits thereof will be added, modulo 2, without carry, to the bits already residing in the accumulator. The fourth key selection effects still a further encoding, the result of which is then fed back through gating means 20 to accumulator ACC–2 where these bits will be summed, modulo 2, without carry, to the bits already residing in the accumulator. This process will continue back and forth with each odd and even key selection until such time as the operator has completed the selection of the data to be printed in a particular line of print.

When the line has been completed, the operator will then depress the check switch 34 and the timer 32 will begin to operate. The first signal received from the timer will be the signal T0. This timing signal is arranged to activate the tabulating solenoid in the typer 12 so that the carriage of the typer will be stepped to a predetermined position along the line being prepared by the operator. This will create a TAB signal on the input of the encoder 16 which will be accumulated along with the prior data selected. The next signal to occur will be the timing signal T1 and this signal will be effective to gate the first three bits from the accumulator ACC–1 through the gating circuitry 24 into the decoder 36 and thence to one of the eight possible output lines to activate the typer 12 and select a numerical code which is uniquely related to that portion of the data derived from the key selections made by each of the odd key operations made by the operator. The next timing function will be the timing signal T2 which will gate the remaining three bits from the accumulator ACC–1 into the decoder 36. Once again a further printing operation will take place by way of the typer 12 so that a further number will be selected in accordance with the next three bits from the accumulator.

The next timing signal from the timer 32 will be the time signal T3 which will activate the gating circuitry 28 and this operation will then be followed by the further operation of the gating circuit 30 as the timing signal T4 becomes operative. The completion of the timing signals T3 and T4 will indicate that the data accumulated in the accumulator ACC–2 will now have been passed through the decoder 36 to the typer 12 and thence onto the document 14.

The final timing signal to occur is the time signal T5 and this signal is used to activate the carriage return solenoid in the typer 12 and thus condition the apparatus for the typing of a further line of print, if desired, by the operator. The timing signal T5 is also adapted to reset the accumulators and the odd-even switching circuitry, by means not shown.

It will be apparent that at the end of this operation, the data desired to be printed on the document 14 will have been printed by the typer 12, and in addition to what was actually printed as selected data, there will be checking data produced in the manner described above, with this checking data appearing at a predetermined location following the data selected by the operator.

The operation may be further understood by reference to Table 1 immediately below which gives a representative example of the type of operation that might be expected from a typical operation of the apparatus illustrated herein.

TABLE 1

| | Encoder Output to— | |
|---|---|---|
| | ACC-1 | ACC-2 |
| A | 010001 | |
| B | | 010010 |
| L | 100011 | |
| E | | 010101 |
| (SPACE)- | 111101 | |
| B | | 010010 |
| A | 010001 | |
| K | | 100010 |
| E | 010101 | |
| R | | 101001 |
| (TAB) (CS) | 101010 | |
| | ACC-1 100001 | ACC-2 011110 |
| | Decoder Output to Typer 4 1 3 6 | |

Referring more specifically to the above Table 1, it is assumed that the selections made by the operator for a particular line of print are the characters of the words ABLE, space or hyphen, and BAKER. In printing these two words, the operator will select each key in sequence and the operator will further hit the space or other word-separating identification key at the end of the word ABLE. As each operation performed by the operator is represented by a code, the codes illustrated in Table 1 may be considered those codes used for representing the character selected with this code being produced on the output of the encoder 16. The code will appear for each key selected including the space or hyphen key. In order to accommodate all of the characters selected, it is necessary to adopt a six-bit code and consequently the selection of the code may be in accordance with standard encoding practice. As shown in Table 1, the code produced by the selection of the letter A will be inserted into the accumulator ACC–1, while the encoding of the second letter selected, B, will produce a code which is inserted into the accumulator ACC–2. This insertion of data into the accumulators in accordance with the odd and even selections will be as described above. The totals appearing in the accumulators at the end of the typing of the two words ABLE and BAKER, as well as the separator between these two words, and the TAB code derived at the start of the final portion of the operation will be as indicated in Table 1. The totals are then examined by the decoder 36 on a three-bit-at-a-time basis. The resultant output selection that will appear in terms of signals for activating the typer 12 will be signals for selecting the numerals 4, 1, 3 and 6. These four numbers will be printed then at the end of the line following the typing of the words ABLE and BAKER.

It will be readily apparent to those skilled in the art that, in any subsequent automatic processing of any document prepared in this manner, it will be possible to determine if the reading of the document as prepared has actually been performed in the manner desired. Thus, any subsequent reading operation by automatic means would provide for the reading of the data as well as the check numbers and in the event that a subsequent calculation based upon the mathematics discussed above should fail to produce numbers agreeing with those transferred with the document, an error would be indicated. It will further be apparent that the data processing apparatus associated with the reading of the document may utilize the checking numbers transferred for purposes of automatic correction in accordance with the principles set forth in the U.S. patent of the present inventor bearing number 2,977,047. Further, the apparatus may be arranged so that fixed-length fields of data are handled, in which even the data may be related to certain fields so as to avoid the possibility of error when spaces appear in the printed text. Such may be appropriately manipulated by the processing apparatus.

It will also be apparent to those skilled in the art that there has been provided in accordance with the teachings of the present invention a simple apparatus which may be used for purposes of producing checking data which may be directly related to data selected by output data at a typing or field-imprinting station. Further, the checking data produced by the apparatus described herein provides a relatively powerful check which may be used for subsequent error detection and correction purposes.

While, in accordance with the provisions of the statutes, there has been illustrated and described the best forms of the invention known, it will be apparent to those skilled in the art that changes may be made in the apparatus described without departing from the spirit of the invention as set forth in the appended claims and that, in some cases, certain features of the invention may be used to advantage without a corresponding use of other features.

Having now described the invention, what is claimed as new and novel and for which it is desired to secure Letters Patent is:

1. A printing apparatus comprising a manual input keyboard having a plurality of separate data-defining keys, a printing means connected to be controlled by said keys and being adapted to print on a record medium data selected by the operation of each of said keys, an encoder having an input from each of said keys and a binary output comprised of plurality bits, binary accumulator means connected to said encoder output, said accumulator means comprising a pair of separate binary accumulators each of which is adapted to be alternately connected with the operation of each key to the output of said encoder, a decoder adapted to be connected in time sequence between outputs of said accumulator means and said printing means, said decoder providing an input to said printing means to activate said printing means in accordance with the accumulation in said accumulator.

2. In an apparatus for recording information the combination comprising first means for transferring information to be recorded and second means for preparing check data from said information to be transferred, said apparatus further comprising data selecting means including a plurality of manually selectable data identifying keys, means connecting the output of each of said plurality of manually selectable keys independently to said first and second means, a data recorder connected through said first and second means to be activated by the data selection of said manually selectable keys, said data recorder being actuated upon selection of said manually selectable keys to record said data selection as transferred through said first means, said data recorder being further actuated to record check data as prepared in said second means, said second means further comprising encoding means connected to be actuated by said selecting means to produce a binary code representation for each data selection made, means connected to said encoding means for accumulating in accordance with a predetermined modulus the total of the binary coded representation for said encoded binary data, and timing means connecting selected portions of the output of said accumulating means to said data recorder to activate said recorder in accordance with the representation in said accumulator.

3. Apparatus for preparing a printed record and associated check data for the printed record comprising first means for transferring information to be recorded and second means for preparing check data from said information to be transferred, said apparatus further comprising an input data-selecting means adapted when activated to effect the printing of data on a record medium, means connecting the output of said data selecting means independently to said first and said second means, a data recorder connected through said first and said second means and adapted to be activated by said data-selection means in accordance with each selection made, said data recorder being further activated to record check data as prepared in said second means, said second means further comprising encoding means connected to said selecting means to produce a binary code representative of each data selection made by way of said selecting means, means connected to the output of said encoding means for accumulating in accordance with a predetermined modulus the total of the encoded binary data, decoding means adapted to be connected to the output of said accumulating means and to said data recorder to activate said recorder in accordance with the normal designations selected by said data-selecting means, and manual means connected to activate the connection of said accumulator to said decoding means.

4. A printing apparatus comprising a manual input keyboard having a plurality of separate data-defining keys, a printing means connected to be controlled by said keys and being adapted to print on a record medium data selected by said keys, an encoder having an input from each of said keys and a six-bit output, a pair of six-bit accumulators connected to said encoder output, means actuated by the operation of each key on said keyboard for alternately activating the connection of said accumulators to the output of said encoder, four transfer circuits each of which is adapted to transfer three bits each and each of which is connected to the outputs of separate sections of said accumulators, sequencing means connected to said transfer circuits to activate said circuits in time sequence, a decoder adapted to be connected between the output of said transfer circuits and said printing means, said decoder providing an input to said printing means to activate said printing means in accordance with selected three-bit outputs from said accumulator.

5. Apparatus as defined in claim 4 wherein said printing means includes a tabulate mechanism, said mechanism being connected to be activated by said sequencing means, mechanism being activated by said sequencing means prior to the activation of said transfer circuits.

6. Apparatus as defined in claim 5, wherein said printing means includes a carriage-return mechanism, said return mechanism being connected to be actuated by said sequencing means following the activation of said transfer circuits.

References Cited by the Examiner

UNITED STATES PATENTS

| | | | |
|---|---|---|---|
| 2,827,623 | 3/1958 | Ainsworth | 235—153 X |
| 2,871,289 | 1/1959 | Cox et al. | 235—153 |
| 2,954,926 | 10/1960 | Crosman | 235—153 |
| 2,975,228 | 3/1961 | Doty et al. | 340—146.1 |
| 3,037,697 | 6/1962 | Kahn | 235—153 |
| 3,078,443 | 2/1963 | Rose | 235—153 |

ROBERT C. BAILEY, *Primary Examiner.*

MALCOLM A. MORRISON, *Examiner.*

M. A. LERNER, *Assistant Examiner.*